United States Patent
Gundavelli et al.

(10) Patent No.: US 9,282,077 B2
(45) Date of Patent: *Mar. 8, 2016

(54) SYSTEM AND METHOD FOR PROVIDING PREFIXES INDICATIVE OF MOBILITY PROPERTIES IN A NETWORK ENVIRONMENT

(71) Applicant: CISCO TECHNOLOGY, INC., San Jose, CA (US)

(72) Inventors: Srinath Gundavelli, San Jose, CA (US); Brian E. Weis, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/733,579

(22) Filed: Jan. 3, 2013

(65) Prior Publication Data

US 2013/0195037 A1 Aug. 1, 2013

Related U.S. Application Data

(63) Continuation of application No. 12/762,204, filed on Apr. 16, 2010, now Pat. No. 8,392,698.

(51) Int. Cl.
*H04W 72/04* (2009.01)
*H04L 29/12* (2006.01)
(Continued)

(52) U.S. Cl.
CPC ...... *H04L 61/2007* (2013.01); *H04L 29/12254* (2013.01); *H04L 29/12283* (2013.01); *H04L 29/12933* (2013.01); *H04L 45/00* (2013.01);
(Continued)

(58) Field of Classification Search
CPC ..... H04L 61/2061; H04L 61/20; H04L 45/72; H04L 61/2007; H04L 61/6068
See application file for complete search history.

(56) References Cited

U.S. PATENT DOCUMENTS 7,130,903 B2 10/2006 Masuda et al.
7,990,893 B1 8/2011 Singh
(Continued)

FOREIGN PATENT DOCUMENTS

WO WO2011/130132 10/2011

OTHER PUBLICATIONS

Cisco Systems, Inc., "MPLS VPN: VRF Selection Based on Source IP Address," © 2007, XP-002644369, 16 pages, retrieved and printed from the Internet on Jun. 22, 2011 http://www.cisco.com/en/US/docs/ios/mpls/configuration/guide/mp_vpn_vrf_select_ip.pdf.
(Continued)

*Primary Examiner* — Omer S Mian
(74) *Attorney, Agent, or Firm* — Patent Capital Group

(57) ABSTRACT

An example method includes receiving an Internet protocol (IP) address request in a network and selecting an IP address associated with a prefix that represents an IP subnet. The prefix includes a color attribute to be provided as part of a communication session that includes a plurality of packets. The prefix defines one or more properties associated with an application for the session. The prefix is communicated to a network element in a signaling plane, the prefix is configured to be used to make a routing decision for at least some of the plurality of packets. In more specific embodiments, the method can include applying one or more network policies based on the prefix associated with the IP address. The method could also include decrypting an encryption protocol in order to identify the prefix of a subsequent communication flow, and executing a routing decision based on the prefix.

35 Claims, 5 Drawing Sheets

(51) Int. Cl.
*H04L 12/701* (2013.01)
*H04L 29/06* (2006.01)
*H04L 29/08* (2006.01)
*H04L 12/721* (2013.01)
*H04W 8/04* (2009.01)

(52) U.S. Cl.
CPC ........ *H04L 61/2038* (2013.01); *H04L 61/2061* (2013.01); *H04L 61/6068* (2013.01); *H04L 63/0428* (2013.01); *H04L 67/12* (2013.01); *H04W 72/04* (2013.01); *H04L 45/72* (2013.01); *H04W 8/04* (2013.01)

(56) References Cited

U.S. PATENT DOCUMENTS

| | | | |
|---|---|---|---|
| 2002/0023160 A1 | 2/2002 | Garrett et al. | |
| 2004/0015607 A1* | 1/2004 | Bender et al. | 709/238 |
| 2004/0114518 A1 | 6/2004 | MacFaden et al. | |
| 2005/0195773 A1* | 9/2005 | Popovich et al. | 370/338 |
| 2005/0208947 A1* | 9/2005 | Bahl | 455/450 |
| 2006/0159100 A1* | 7/2006 | Droms et al. | 370/395.2 |
| 2006/0182118 A1 | 8/2006 | Lam et al. | |
| 2007/0124496 A1 | 5/2007 | Laamanen et al. | |
| 2009/0106036 A1* | 4/2009 | Tamura et al. | 705/1 |
| 2009/0161668 A1 | 6/2009 | Mullooly et al. | |
| 2009/0265767 A1* | 10/2009 | Rune et al. | 726/5 |
| 2010/0215019 A1* | 8/2010 | Velev et al. | 370/331 |

OTHER PUBLICATIONS

Quain, John R., "Car of the Future Could Include Personalized Dashboards," Wheels Blog—NYTimes.com, May 11, 2010, 2 pages http://wheels.blogs.nytimes.com/2010/05/11/car-of-the-future-could-include-personalized-dashboards/?hp.
PCT Jul. 1, 2011 Transmittal of the International Search Report (5 pages) and Written Opinion of the ISA (6 pages) from PCT/US2011/031867.
PCT Oct. 16, 2012 International Preliminary Report on Patentability from PCT/US2011-031867.
USPTO Aug. 24, 2012 Non-Final Office Action from U.S. Appl. No. 12/762,204.
USPTO Nov. 26, 2012 Response to Aug. 24, 2012 Non-Final Office Action from U.S. Appl. No. 12/762,204.
USPTO Dec. 13, 2012 Notice of Allowance from U.S. Appl. No. 12/762,204.
Draves, R., "Default Address Selection for Internet Protocol Version 6 (IPv6)," Network Working Group, RFC 3484, Feb. 2003, 25 pages, http://tools.ietf.org/pdf/rfc3484.pdf.
Troan, O., et al., "IPv6 Prefix Options for Dynamic Host Configuration Protocol (DHCP) Version 6," Network Working Group, RFC 3633, Dec. 2003, 19 pages http://tools.ietf.org/pdf/rfc3633.pdf.
Kaufman, C., "Internet Key Exchange (IKEv2) Protocol," Network Working Group, RFC 4306, Dec. 2005, 100 pages, http://tools.ietf.org/pdf/rfc4306.pdf.
Kinnear, Kim, et al., "Virtual Subnet Selection Options for DHCPv4 and DHCPv6," DHC Working Group, Mar. 4, 2009, 21 pages, http://tools.ietf.org/pdf/draft-ietf-dhc-vpn-option-11.pdf.

* cited by examiner

SYSTEM AND METHOD FOR PROVIDING PREFIXES INDICATIVE OF MOBILITY PROPERTIES IN A NETWORK ENVIRONMENT

RELATED APPLICATION

This Application is a continuation (and claims the benefit of priority under 35 U.S.C. §120 of U.S. application Ser. No. 12/762,204, filed Apr. 16, 2010, entitled "SYSTEM AND METHOD FOR PROVIDING PREFIXES INDICATIVE OF MOBILITY PROPERTIES IN A NETWORK ENVIRONMENT," Inventor(s) Srinath Gundavelli, et al. The disclosure of the prior application is considered part of (and is incorporated by reference in) the disclosure of this application.

TECHNICAL FIELD

This disclosure relates in general to the field of communications and, more particularly, to providing prefixes indicative of mobility properties in a network environment.

BACKGROUND

Networking architectures have grown increasingly complex in communications environments. As the subscriber base of end users increases, and as new applications are developed, proper routing and efficient management of communication sessions and data flows becomes even more critical. In Internet Protocol (IP) architectures for certain applications (e.g., involving automobiles), there is a mobile router that can function as a gateway for devices and networks within the system. Coordinating the associated communication sessions for these systems presents a significant challenge to system designers, automobile manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

An example method includes receiving an Internet protocol (IP) address request in a network and selecting an IP address associated with a prefix that represents an IP subnet. The prefix includes a color attribute to be provided as part of a communication session that includes a plurality of packets. The prefix defines one or more properties associated with an application for the session. The term 'prefix' represents a generic term that signifies one or more intelligent groupings of IP addresses (e.g., an IP subnet). An IP node is commonly assigned a single IP address, but in some cases, a whole subnet/prefix can be assigned. For example, in the case of a cable modem implementation at home, an operator can assign a whole subnet to the cable modem. There can be multiple IP devices behind the cable modem using addresses from the assigned subnet. The term 'color' can represent the property of an IP address, or for all the IP addresses in a subnet/prefix.

The prefix is communicated to a network element in a signaling plane, the prefix is configured to be used to make a routing decision for at least some of the plurality of packets. In more specific embodiments, the method can include applying one or more network policies based on the prefix associated with the IP address. The method could also include decrypting an encryption protocol in order to identify the prefix of a subsequent communication flow, and executing a routing decision based on the prefix of the subsequent communication flow.

In more specific embodiments, the method can include applying one or more network policies based on the prefix associated with the IP address. The method could also include decrypting an encryption protocol in order to identify the prefix of a subsequent communication flow, and executing a routing decision based on the prefix of the subsequent communication flow. In yet other embodiments, the method can include downloading a plurality of prefixes from a prefix pool, the prefixes define particular properties associated with a plurality of IP addresses. In more specific embodiments, the prefix indicates routing restrictions for the packets being routed within a home network, and the prefix has a global meaning in the network. The example application can be associated with Internet access for the communication session, vehicle diagnostics for a vehicle, or a navigation system of the vehicle.

Example Embodiments

Figure 1:
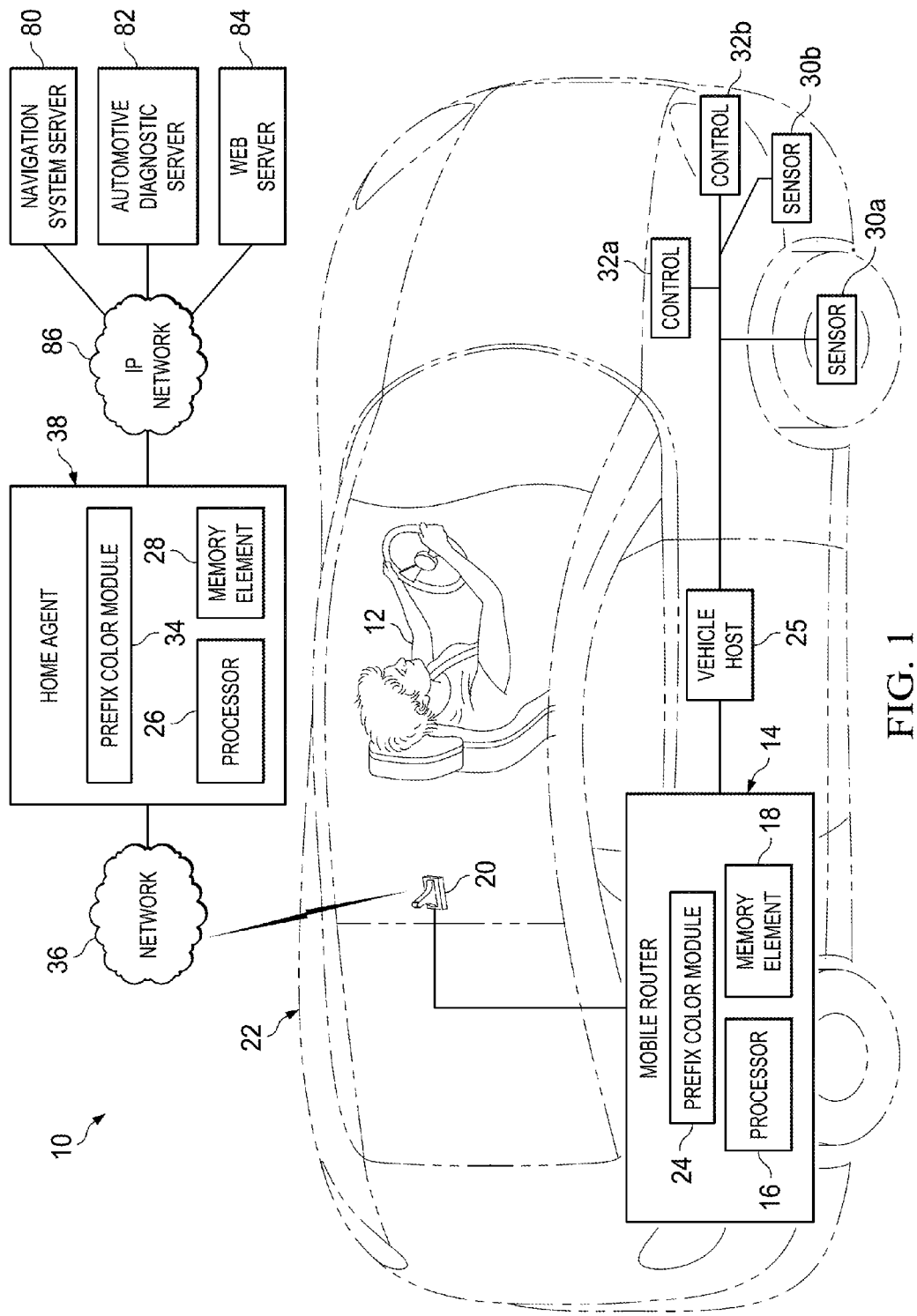
FIG. 1 is a simplified schematic diagram of a communication system for providing prefixes indicative of mobility properties in a network environment in accordance with one embodiment of the present disclosure.

Turning to FIG. 1, FIG. 1 is a simplified block diagram of a communication system 10 for providing prefixes indicative of mobility properties in a network environment. The example architecture of FIG. 1 includes an end user 12, who is operating a vehicle 22 that includes an antenna 20. In this particular example, vehicle 22 includes a mobile router 14 that further includes a processor 16, a memory element 18, and a prefix color module 24. Mobile router 14 can be suitably coupled to a vehicle host 25, which has connections to a plurality of sensors 30a-b and a plurality of controls 32a-b. Sensors 30a-b and controls 32a-b may be part of an automotive diagnostic system, as further detailed below.

FIG. 1 also includes a network 36 that can achieve some level of connectivity with vehicle 22 (e.g., via antenna 20). Network 36 has a logical coupling to a home agent 38, which further comprises a prefix color module 34, a processor 26, and a memory element 28. FIG. 1 also includes an IP network 86, which has connections to a navigation system server 80, an automotive diagnostic server 82, and a web server 84.

In one particular example, the elements of communication system 10 cooperate in order to offer a mobile network prefix coloring application. In one particular scenario, home agent 38 is configured to use vendor-specific extensions in the mobile Internet Protocol (IP) version six (MIPv6) signaling plane to mark designated prefixes. This would allow the network to represent prefix properties in specific prefix coloring. Such prefix mechanisms could be applicable to various environments, such as those involving a mobile virtual private network (VPN), mobile network solutions generally, cable configurations, digital subscriber line (DSL) arrangements, dynamic host configuration protocol (DHCP) v6, proxy MIP (PMIP) v6, hierarchical mobility systems, etc.

Each of the elements of FIG. 1 may couple to one another through simple interfaces or through any other suitable connection (wired or wireless), which provides a viable pathway for communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol, where appropriate and based on particular needs.

Note that before proceeding to the operational aspects of communication system 10, it is important to offer an overview of the problems encountered in current mobile router provisioning scenarios. Such information is offered earnestly and for teaching purposes only and, therefore, should not be construed in any way to limit the broad applications of the present disclosure. In the IP architecture for vehicle 22, mobile router 14 functions as a gateway to the IP networks and devices inside vehicle 22. Mobile router 14 can have multiple radio interfaces (e.g., WiFi, cellular, evolution data optimized (EVDO), satellite, WiMAX, long-term Evolution (LTE), etc.) for IP connectivity. Mobile router 14 can establish a mobile VPN session using IKEv2/IPsec/MobIKE and, further, obtain the delegated prefixes for its internal network usage. Mobile router 14 can also use Mobile IP (MIP) for establishing a MIP/network mobility (NEMO) tunnel for dynamically requesting prefixes for its internal network.

Typically, mobile routers are small customer premises equipment (CPE) devices deployed in automobiles. Given their mobile nature, the devices can attach to the network via 3G access, or via a public wireless local area network (WLAN) access. The access network typically does not control the vehicle's service provider.

Commonly, the automobile network has several classes of network devices with different network usage scope. A controller-area network (CAN) bus is a vehicle bus standard designed to allow microcontrollers and devices to communicate with each other within a vehicle (e.g., without a host computer). CAN is a message based protocol, designed for automotive applications, but can also be used in other areas such as industrial automation, medical equipment, etc. There can be a CAN BUS network for the microcontrollers in vehicle 22, where the manufacturer of vehicle 22 can collect real-time vehicle diagnostics data from associated devices. Any routing associated with a diagnostic application should be confined to the diagnostic management center because the diagnostic data is confidential. There is a separate network for the IP devices involved in vehicle navigation systems and, possibly, another network associated with simple content delivery. Another network could be used for Internet access for end user 12. Hence, there are varied levels of network usage having different purposes. The network usage in each of the previous cases has a different usage scope, different latency, different associated routing, different policy requirements, etc.

Hence, there are several mobility management protocols (e.g., General Packet Radio Service (GPRS) Tunneling Protocol (GTP), MIP, etc.) operating on the backend of mobile router 14. Mobile router 14 can be assigned an IP subnet such that it can assign addresses from the subnet for different IP devices under its control. For example, each of the IP devices under the automobile internal scope could be assigned addresses from one subnet/prefix, whereas laptop users in vehicle 22 can be assigned addresses from a different subnet/prefix. The usage scope in both cases would be different.

Thus, the particular IP address can be indicative of how the associated session should be treated. There are designated rules in place for how to treat certain sessions, once the mobility properties of the IP address have been identified. For example, if a roaming scenario were occurring, the session would be treated in a certain manner to accommodate this behavior. Similarly, if the IP address has no mobility properties, when roaming occurred during the session, the connection would be broken. A gap exists in that no mechanism empowers mobile router 14 with knowledge, or with information to help it determine the properties associated with a given IP address.

In one particular example, the term 'prefix' represents a generic term that signifies one or more intelligent groupings of IP addresses (e.g., an IP subnet). An IP node is typically assigned a single IP address, but in some cases, a whole subnet/prefix is assigned. For example, in the case of a cable modem implementation at home, the operator assigns a whole subnet to the cable modem. There can be multiple IP devices behind the cable modem using addresses from the assigned subnet. In terms of configuration/provisioning, there can be a one-to-one mapping between a prefix and a class of IP devices. The term 'color' can represent the property of an IP address, or for all the IP addresses in a subnet/prefix. For example, if mobile router 14 in vehicle 22 is assigned two prefixes (e.g., Prefix-1 with property-X and Prefix-2 with property-Y), any communication flows using an address from Prefix-1 can have the property-X. More specifically, this is in regards to how the network treats the communication flows originating with the source address from Prefix-X. The network may simply redirect all the communication flows using the source address from Prefix-X to a server, or it may allow for internet access, etc. as discussed below.

In operational terms, the prefix is simply connoting a group of IP addresses such that multiple IP devices behind a device can use addresses from that subnet. Communication system 10 can assign a subnet to mobile router 14, where each of those subnets can have different properties. Mobile router 14 can use the correct subnet/prefixes for assigning IP addresses from specific prefixes (i.e., color), for different classes of IP devices.

Any delegated prefixes (when seen from the perspective of mobile router 14) would appear to be like any other prefix, but each of the prefixes has different properties. Some prefixes may be topologically local. Other prefixes may be remote and anchored on a global anchor, but still available to the local anchor through a tunneling setup in the network (i.e., between the local anchor and the global anchor). This is the case for chained mobility, which may involve regional and local home agents. Additionally, certain prefixes may be local and have low latency characteristics (e.g., suitable for a voice call breakout), whereas others may have global mobility support. There are no semantics available for network 36, for a VPN concentrator, or for home agent 38 to notify mobile router 14 of the properties of each of the prefixes that are assigned to mobile router 14 (e.g., over the IKEv2 or Mobile IP signaling plane).

Communication system 10 is configured to address this issue (and others) by effectively coordinating prefix colors for optimal traffic routing. Such a scheme can allow mobile router 14 in vehicle 22 to assign specific prefixes for the in-vehicle microcomputers, for vehicle diagnostics, for Internet access, or for any other application, use, service, etc. Moreover, such an approach could allow mobile router 14 to use a specific purpose for a local voice breakout, instead of having the voice traffic unnecessarily routed through a remote home network. In essence, the prefix coloring scheme has wide applicability to mobile networks, to mobile VPN solutions, etc. Currently, in these environments, end nodes have no concept of the properties of a prefix, nor can they comprehend the latency implications of using an IP address from a prefix associated with a specific purpose. There is no knowledge as to whether the prefix is local, or if the prefix is from a remote home agent (e.g., with the tunneling in the network enabling its potential usage).

In essence, communication system 10 can define a mechanism to identify which prefixes are assigned to particular devices and, further, have the network apply policies based on the IP address scope. Note that having the ability to color the assigned prefixes/IP address can allow the endpoint to use the correct IP addresses for implementing source address selection rules. The intent is to convey the usage scope of a delegated prefix, where certain prefixes have mobile properties, and other prefixes have routing restrictions beyond the home network. One model presented herein can achieve the prefix coloring via messaging in the signaling plane. Hence, the mechanisms of communication system 10 can allow the mobility entities to signal the properties of the prefixes as part of the mobility signaling. This signaling can be executed at the time of the prefix assignment, where the interaction becomes dynamic.

Before turning to some of the operations of this architecture, a brief discussion is provided about the infrastructure of FIG. 1. End user 12 can be associated with clients or customers wishing to initiate a communication in communication system 10 via some network. The terms 'mobile node', 'end user', and 'subscriber' are synonymous and, further, are inclusive of devices used to initiate a communication, such as a computer, a personal digital assistant (PDA), a laptop or electronic notebook, a cellular telephone, a smartphone, an i-Phone, an IP phone, or any other device, component, element, or object capable of initiating voice, audio, video, media, or data exchanges within communication system 10. End user 12 may also be inclusive of a suitable interface to the human user, such as a microphone, a display, a keyboard, or other terminal equipment. End user 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another. In certain embodiments, end user 12 has a bundled subscription for network access and application services (e.g., voice), etc. Once the access session is established, the user can register for application services as well, without additional authentication requirements.

Network 36 represents a series of points or nodes of interconnected communication paths for receiving and transmitting packets of information that propagate through communication system 10. Network 36 offers a communicative interface between any of the components of FIG. 1 and remote sites and/or devices, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Network 36 may implement a UDP/IP connection and use a TCP/IP communication language protocol in particular embodiments of the present disclosure. However, network 36 may alternatively implement any other suitable communication protocol for transmitting and receiving data packets within communication system 10.

In one example implementation, vehicle 22 is configured for 3G connectivity. Vehicle 22 can be any type of a transportation device including a car, a truck, a motorcycle, a scooter, an electric vehicle, a hybrid, or any other type of device capable of travel. Devices within vehicle 22 can leverage this connectivity to provide enhanced services for end user 12, access network communications, etc. An access point may be provided within the vehicle 22 such that all devices within the vehicle 22 can connect to the network through this access point. In one particular example, mobile router 14 provides the access point for the devices of vehicle 22.

For example, mobility properties are important in the transportation context. When the network issues an IP address that has mobility properties, it means that when the particular device roams into another network, connectivity is ensured for that particular session. In cases where the IP address does not have mobility properties, then the devices roaming to a different network can have their connectivity terminated. By appropriately tagging the IP address with a suitable color (i.e., prefix), these mobility properties can quickly be conveyed to mobile router 14. The colors can be marked in the signaling plane (e.g., red, blue, green, white, etc.). As used herein, the term 'color' is meant to signify an element that can be mapped to a property, which can be recognized by devices and/or network elements. In this generic sense, color is just an indication of one or more properties that have some global meaning in the network, or the associated system (e.g., based on a related IP address). Further, coloring is simply an organizational protocol, where groupings can be defined for particular capabilities or for characteristics of a given IP address. The term 'color attribute' refers to any element that can be used to identify a prefix (e.g., a tag, a flag, an extension, an index, a field, a definition, etc.) and that could be systematically/consistently applied in the context of communication sessions. In the data plane for a corresponding communication session (where packets are being exchanged), network elements can simply use the IP address (in which the prefix was included) for optimally routing traffic.

In one embodiment, home agent 38 is a router on a mobile node's home network that tunnels datagrams for delivery to the mobile node when it is away from its configured home. Home agent 38 can maintain current location (IP address) information for the mobile node. Home agent 38 can use tunneling mechanisms to forward Internet traffic so that a device's IP address does not have to be changed each time it connects from a different location. Home agent 38 can be used with one or more foreign agents. Both the foreign agent and home agent 38 are two types of mobility agents. In more general terms, mobile IP specifies how a mobile node registers with its home agent 38 and how home agent 38 routes datagrams to the mobile node through the tunnel. Mobile IP provides an efficient, scalable mechanism for roaming within the Internet. Using Mobile IP, nodes may change their point-of-attachment to the Internet without changing their home IP address. This allows them to maintain transport and higher-layer connections while roaming.

Home agent 38 can effectively extend the signaling chain to offer additional information about the properties associated with an IP address being used for a communication session. In a generic sense, extension options to the signaling can be used to identify usage scope for the particular IP address being issued. The usage scope can have a global meaning in the network. Home agent 38 is the device that is assigning IP addresses to mobile router 14. Mobile router 14 can maintain these addresses and, subsequently, when a given device within vehicle 22 requests an IP address, that device also informs mobile router 14 of its purpose (e.g., via the prefix that is being employed). Note that the configuration of prefix color module 34 being included in home agent 38 is based on a particular use case. This same functionality can be provided in other systems (e.g., as part of a VPN arrangement involving a VPN concentrator, a VPN server, etc.). Hence, such functionality can be easily replicated in other architectures based on particular scenarios and particular needs. Some of these possibilities are detailed below with reference to FIGS. 2A-4.

In one example implementation, mobile router 14 and home agent 38 are network elements that facilitate or otherwise help coordinate the signaling of mobility properties (e.g., for devices, for end users, or for a network such as that illustrated in FIG. 1). As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, mobile router 14 and home agent 38 include software (e.g., as part of prefix color modules 24, 34) to achieve the prefix coloring operations, as outlined herein in this Specification. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In regards to the internal structure associated with communication system 10, each of mobile router 14 and home agent 38 can include memory elements for storing information to be used in achieving the prefix coloring operations, as outlined herein. Additionally, each of these devices may include a processor that can execute software or an algorithm to perform the prefix coloring activities as discussed in this Specification. These devices may further keep information in any suitable memory element [random access memory (RAM), a read only memory (ROM), a field programmable gate array [FPGA], an erasable programmable read only memory (EPROM), an electrically erasable programmable ROM (EEPROM)) or an ASIC, etc.], software, hardware, or in any other suitable component, device, element, or object where appropriate and based on particular needs. Any of the memory items discussed herein should be construed as being encompassed within the broad term 'memory element.' The information being tracked or sent in communication system 10 could be provided in any database, register, cache, queue, control list, or storage structure: all of which can be referenced at any suitable timeframe. Any such storage options may be included within the broad term 'memory element' as used herein in this Specification. Similarly, any of the potential processing elements, modules, microprocessors, digital signal processors (DSPs), and machines described in this Specification should be construed as being encompassed within the broad term 'processor.' Each of the network elements and user equipment (e.g., mobile nodes) can also include suitable interfaces for receiving, transmitting, and/or otherwise communicating data or information in a network environment.

Note that in certain example implementations, the prefix coloring functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM) or an ASIC that includes digital logic, software, code, electronic instructions, or any suitable combination thereof.

Figure 2A:
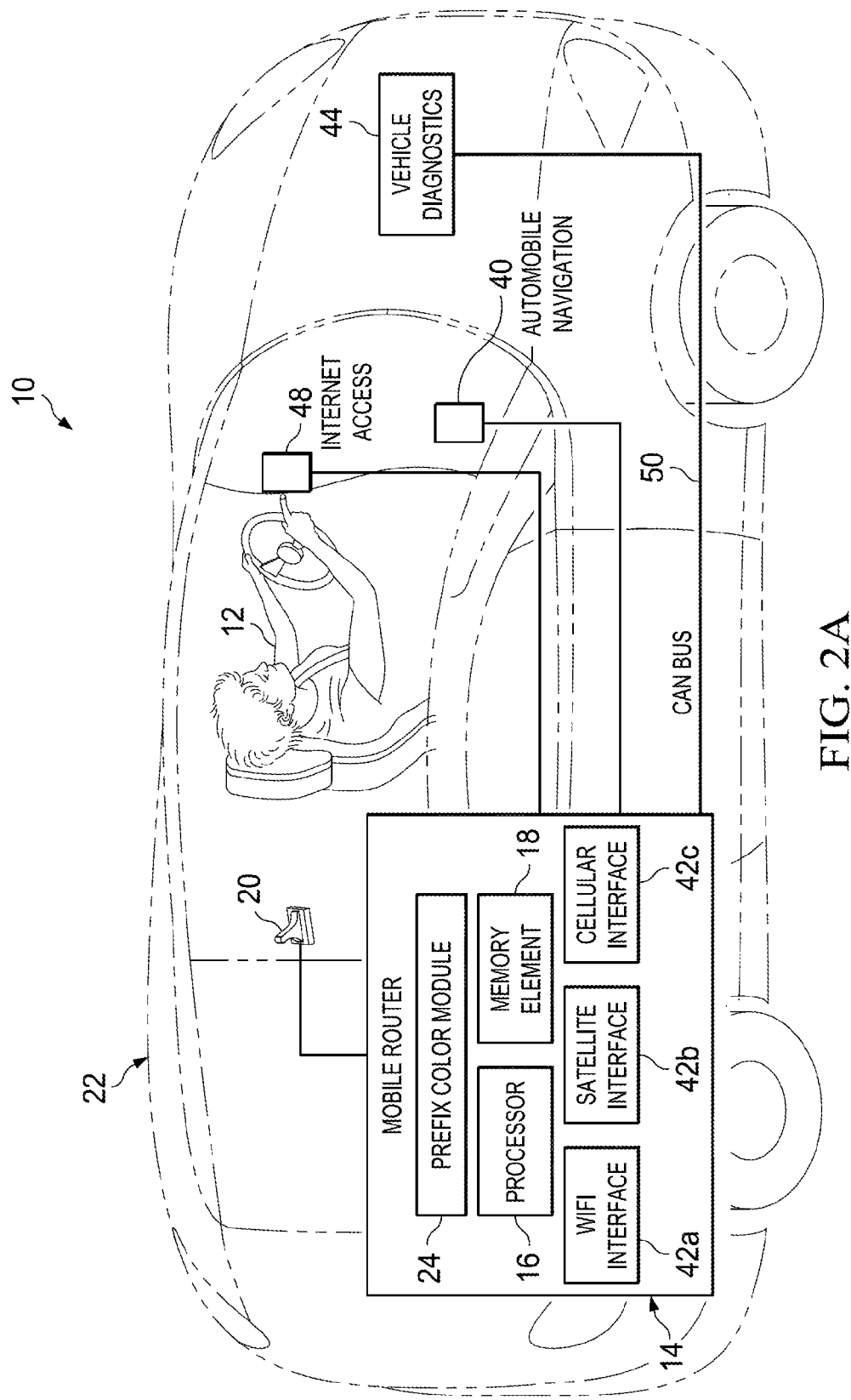
FIG. 2A is a simplified schematic diagram of another embodiment of the communication system for providing prefixes indicative of mobility properties in a network environment.

FIG. 2A is a simplified schematic diagram of another embodiment associated with communication system 10. In this particular example, vehicle 22 includes capabilities associated with automobile navigation 40 (e.g., a global positioning system (GPS)), vehicle diagnostics 44, and Internet access 48. Additionally, a number of interfaces are provided within mobile router 14, the interfaces including a WiFi interface 42a, a satellite interface 42b, and a cellular interface 42c. Additional interfaces may readily be provided to mobile router 14 and, further, such interfaces may be based on particular communication needs. A link is also provided between vehicle diagnostics 44 and mobile router 14, where the link is provided as a CAN bus 50.

Figure 2B:
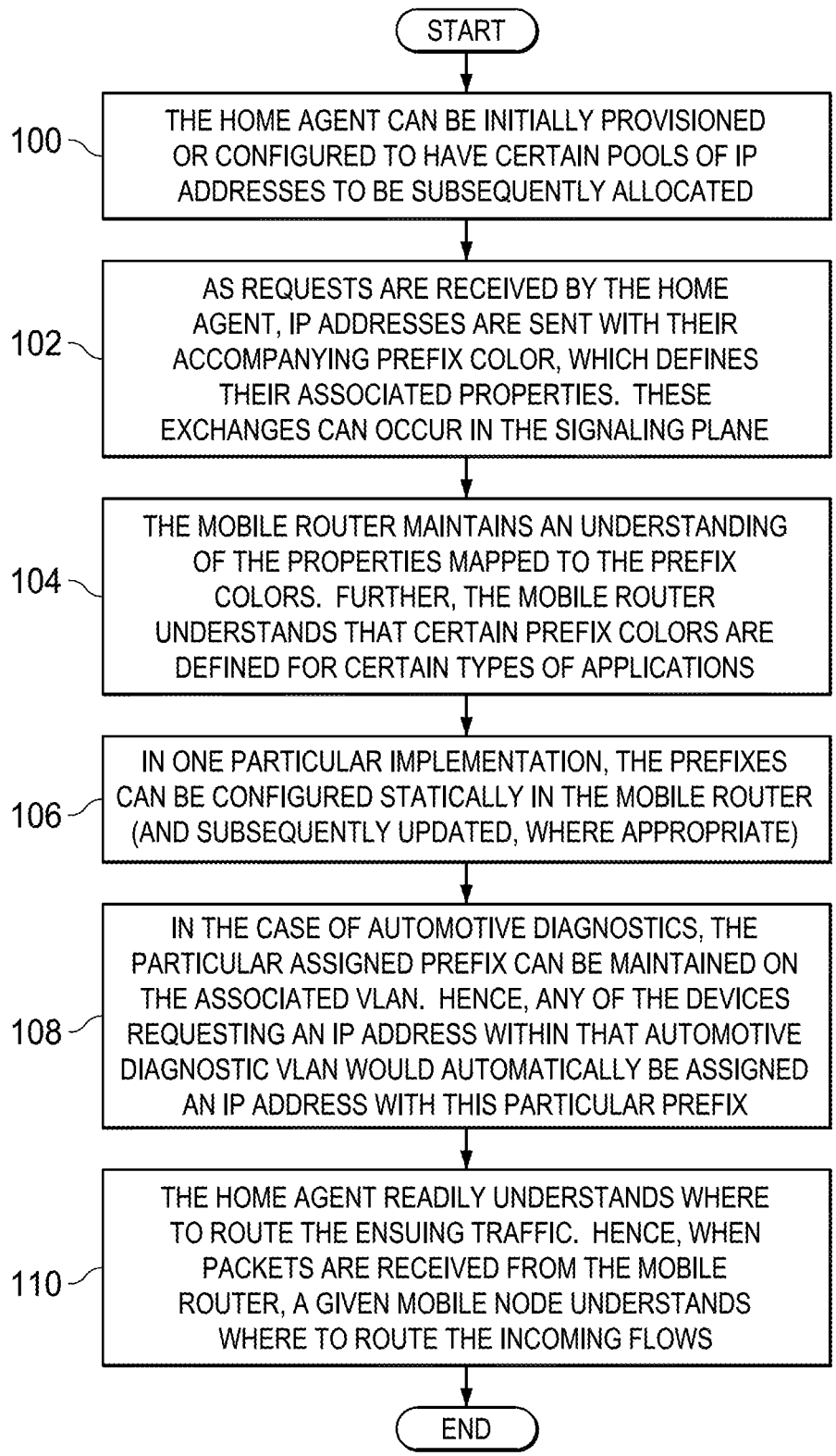
FIG. 2B is a simplified flowchart associated with one possible activity associated with the present disclosure.

FIG. 2B is discussed in conjunction with FIG. 2A, as it represents a simplified related flowchart in accordance with an embodiment of the present disclosure. FIGS. 2A-B are related in their operations and, as such, they are discussed together. In operation, home agent 38 can be initially provisioned or configured to have certain pools of IP addresses to be subsequently allocated. This is shown as step 100 of FIG. 2B. The IP addresses have tags for indicating their particular properties in order to achieve the prefix coloring, as discussed herein. As requests are received by home agent 38, IP addresses are sent with their accompanying prefix color, which defines their associated properties. These exchanges can occur in the signaling plane, as shown in step 102 of FIG. 2B. In a reciprocal fashion, mobile router 14 maintains an understanding of the properties mapped to the prefix colors.

Further, mobile router 14 understands that certain prefix colors are defined for certain types of applications (associated with communication sessions) involving devices that request connectivity through mobile router 14. This is shown as step 104 of FIG. 2B. In one particular implementation, the prefixes can be configured statically in mobile router 14 (and subsequently updated, where appropriate). This is shown as step 106 of FIG. 2B. For example, in the case of automotive diagnostics, that particular assigned prefix can be maintained on the associated VLAN. Hence, any of the devices requesting an IP address within that automotive diagnostic VLAN would automatically be assigned an IP address with this particular prefix. This is shown as step 108 of FIG. 2B.

Note also that in using these prefixes, home agent 38 readily understands where to route the ensuing traffic. Hence, when packets are received from mobile router 14, a given mobile node understands where to route the incoming flows. This is shown as step 110 of FIG. 2B. In operation, and with regard specifically to the coloring configurations, each mobile network prefix that is assigned to mobile router 14 can be marked with its specific color. Each of these colors can have a standard definition on the usage scope, purpose, and any other characteristic that can be known to the network and/or to other mobile routers. These colors are effectively identifying the properties of the prefix. The properties can be associated with virtually any application associated with a communication session. For example, a prefix that has no mobility support would not be routed through the remote home network. Other prefixes that have mobility properties can be routed through the home network, where such prefixes would be suited for global reachability (i.e., and not for latent-sensitive flows).

In one particular arrangement, the prefix color RED is meant to signify packets associated with vehicle diagnostics 44. In general terms, this prefix is intended to be assigned to the addresses associated with on-board vehicular computers built into vehicle 22. In one example, the routing for these prefixes should be sent directly to the manufacturer of vehicle 22 (e.g., to the corporate server). The prefix color BLUE is meant to signify packets associated with Internet access 48. In general terms, this prefix is intended for assignment to end users in vehicle 22 for Internet access. The prefix color GREEN is meant to signify flows associated with a local access network (e.g., having non-mobile properties). In general terms, this prefix is topologically anchored in the access network. The prefix has no mobile properties such that it can be locally routed. This prefix could be used for voice sessions, when local breakout is appropriate.

The prefix color WHITE is meant to signify packets associated with a global home agent assignment (i.e., involving chained mobility). In general terms, this prefix is topologically anchored in the mobile node's home network, where it would have mobility properties. Any network sessions established using this address can have mobility properties. The prefix color ORANGE can signify flows associated with management interfaces. In general terms, this prefix can be intended for assignment to the management interfaces of the network nodes of vehicle 22.

It should be noted that although the previous discussions have focused on network prefix coloring, the prefix coloring is an enabling technology. The discussed concepts detail a broader system, where devices on the LAN (e.g., behind a given mobile router) are responsible for a different service. Devices would communicate with other devices in the same service and sharing the same gateway. Additionally, the traffic from all services is sent (e.g., encrypted) across the WAN, and to a WAN gateway. That particular WAN gateway can route traffic between the mobile router and application servers, which could be unique to each service. For the correct routing of packets, the WAN gateway and the mobile router are likely to use distinct address spaces to separate traffic between the different services. Hence, an attribute can be employed for the gateway and the mobile router to use in identifying each service address space.

Additionally, the use of VLANs, IEEE 802.1X, encryption, and/or other means of separation can also be used on the LAN, if the security policy requires such mechanisms. Tagging may (or may not) be applied to an encrypted packet crossing the WAN. Tagging is less likely to be carried end-to-end from the device through the WAN (e.g., extending to an application server), because all of these devices are unlikely to be maintained by a single administrative entity.

Figure 3:
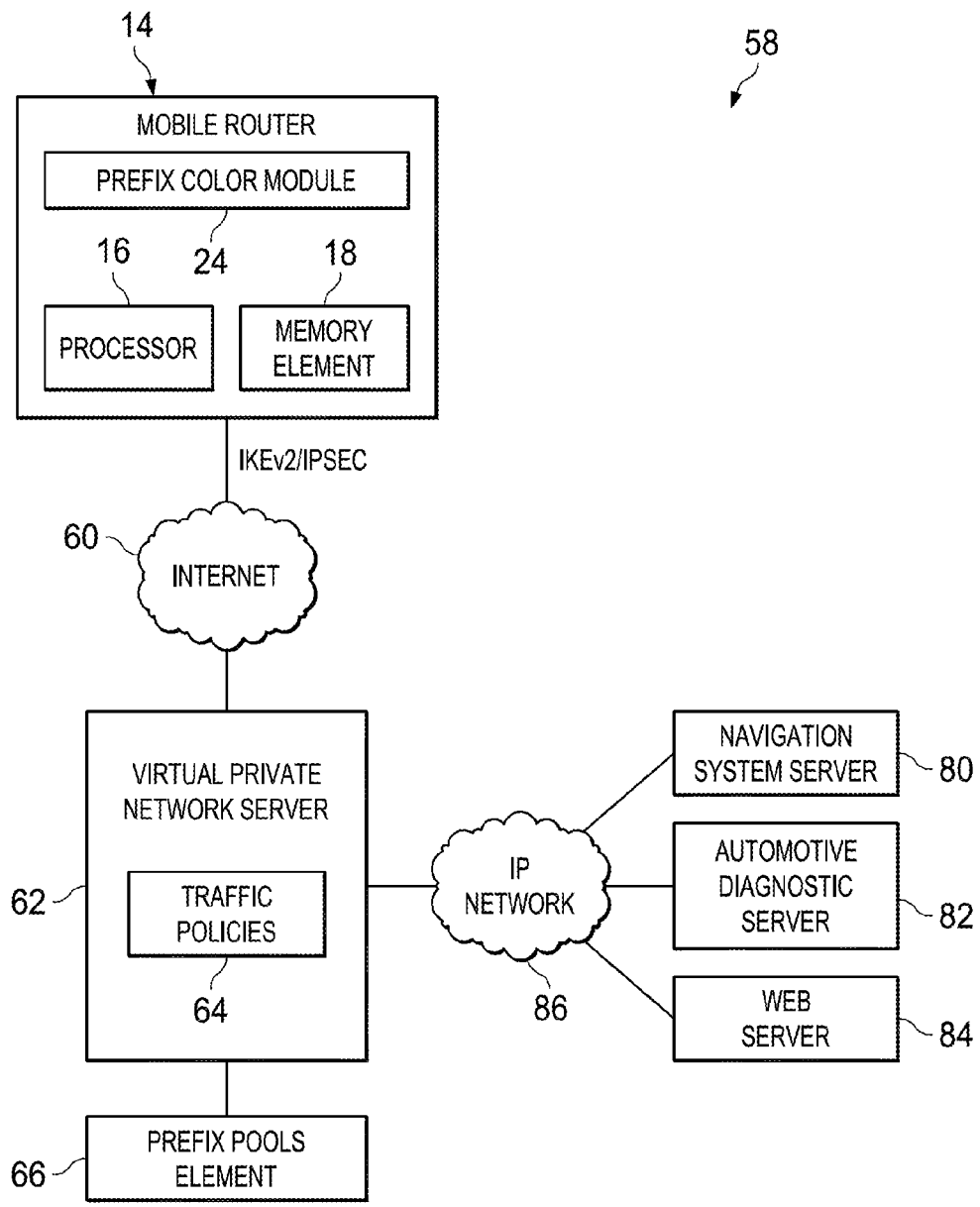
FIG. 3 is a simplified block diagram of another embodiment of a system for providing prefixes indicative of mobility properties in a network environment.

FIG. 3 is a simplified block diagram of a system 58 associated with an alternative embodiment of the present disclosure. FIG. 3 includes mobile router 14 being coupled to an Intranet 60, which is linked to a VPN server 62. VPN server 62 includes traffic policies 64 and, further, VPN server 62 is coupled to a prefix pools element 66. Each of traffic policies 64 and prefix pools element 66 can be provided as memory elements, as databases, as servers, etc. In addition, VPN server 62 is coupled to IP network 86, which has connections to navigation system server 80, automotive diagnostic server 82, and web server 84.

In one particular implementation, a VPN concentrator in the enterprise (using IKEv2) can assign IPv6 prefixes to mobile router 14 using a configuration payload. The prefix pools being managed (e.g., in an Authentication, Authorization, and Accounting (AAA) element, in local pools, etc.) can be segregated based on the usage scope, and traffic policies 64 can be enabled on VPN server 62 based on the prefix types.

On the network anchor (i.e., the network node), any suitable number of pools can be configured. For example, one pool can be for Internet access, another pool for vehicle diagnostics, and another pool for automobile navigation. Essentially any functionality or service sought to be used by an end user can be configured in one of the pools. The addresses can be tagged based on their specific properties. In one particular implementation, the tagging is associated with prefix coloring, as detailed herein, where a specific field can be used to signify the prefix attribute(s). The prefixes represent tags that indicate particular properties (inclusive of the applications for use), where one specific prefix could represent packets intended for automotive diagnostics, for navigation system applications, for Internet usage, etc.

In one example case, mobile router 14 can be allocated a set of prefix pools using an existing provisioning mechanism (e.g., an IKE configuration payload). This can include passing a portion of policy data (e.g., color) along with each prefix pool. The ability to pass this small piece of policy data enables the larger solution. The actual color could be a VLAN tag, a TrustSec tag, etc. or it could involve a new element or object. Any of these possibilities are included within the broad term 'color' as used herein in this Specification. The more significant issue is having mobile router 14 and the WAN gateway agree on the meaning of the color such that they coordinate their activities in providing an appropriate classification and/or separation of communications flows.

Mobile router 14 has the intelligence to know which pool should be accessed in order to issue new IP addresses being requested by devices within a system. In certain examples, a given device associated with automobile diagnostics can have an authentication exchange with mobile router 14. An automobile manufacturer can provision a device to perform this exchange each time it seeks an IP address from mobile router 14. This could further involve a public/private pairing for signaling, or other security mechanisms that would secure the communication session, or otherwise protect the information being exchanged between mobile router 14 and the requesting device. When the packets are sent back through mobile router 14, they can be quickly routed to their appropriate next network based on mobile router 14 being able to identify the prefix color.

In operation of an example that involves an automotive scenario, a vehicle can be started such that mobile router 14 is effectively turned ON. Subsequently, mobile router 14 is configured to connect to a suitable network element for achieving connectivity to network services, network resources, etc. For example, mobile router 14 can connect to VPN server 62 via some type of network (e.g., Intranet 60). VPN server 62 is configured to issue IP addresses, forward IP addresses, etc. to mobile router 14. In a generic sense, this is the same model for a VPN gateway in an enterprise environment. In one particular example, VPN server 62 downloads the necessary prefixes from prefix pools element 66. These prefixes will subsequently be used to define particular properties for individual flows.

Initially, mobile router 14 simply connects to VPN server 62 (e.g., via IKEv2/IPsec, which is a key management protocol) before communicating with other devices. Mobile router 14 and VPN server 62 can effectively authenticate each other using any suitable protocol. Additionally, authorization activities can occur between these devices at this stage. As part of this authorization, VPN server 62 can access traffic policies 64 in order to identify the services and capabilities associated with a particular user of the vehicle. For example, this particular user could have purchased a navigation system service, a diagnostic service, and an Internet service for the vehicle such that he is afforded these services. Because of these services, three different prefixes are passed down to mobile router 14 to identify these specific applications.

In the reverse direction, when packets are sent by mobile router 14 to VPN server 62, VPN server 62 can decrypt the encryption protocol (e.g., IPsec) in order to discover the IP address. The particular IP address/prefix was allocated to mobile router 14 and, more specifically, for a particular service (e.g., a navigation system, automotive diagnostics, etc.). This would allow VPN server 62 to immediately route these packets to their specific destination. For example, if this IP address/prefix were assigned to the navigation system, then once the IP address were discovered by VPN server 62 (which quickly understood the associated prefix), then these packets would be subsequently routed to navigation system server 80. Similarly, VPN server 62 could route traffic to automotive diagnostic server 82, where that particular automotive diagnostic prefix was linked to an IP address, which was discovered within an incoming packet received from mobile router 14. In the case of simple Internet usage, VPN server 62 can readily identify the associated prefix and send those packets to their intended destination.

Continuing along with a particular automotive example, when the end user begins driving, he may elect to use his navigation system. The navigation system device in the vehicle can initiate a process in which it interacts with mobile router 14 to prove that it is a duly authorized navigation system for this particular vehicle. Once the mobile router 14 accepts this navigation system device, it will then issue it an IP address having a corresponding prefix. The particular prefix was sent (or provisioned) by VPN server 62. Once packets begin propagating from the navigation system device toward mobile router 14, mobile router 14 can encrypt the packets and forward them along to VPN server 62. VPN server 62 can decrypt the packet, recognizing that this IP address is part of the subnet associated with a prefix corresponding to a navigation system application, and quickly route the packet based on the particular application. In this sense, these packets have a rather linear route to their intended destination (in contrast to packets being routed to various extraneous locations before reaching the appropriation location).

Figure 4:
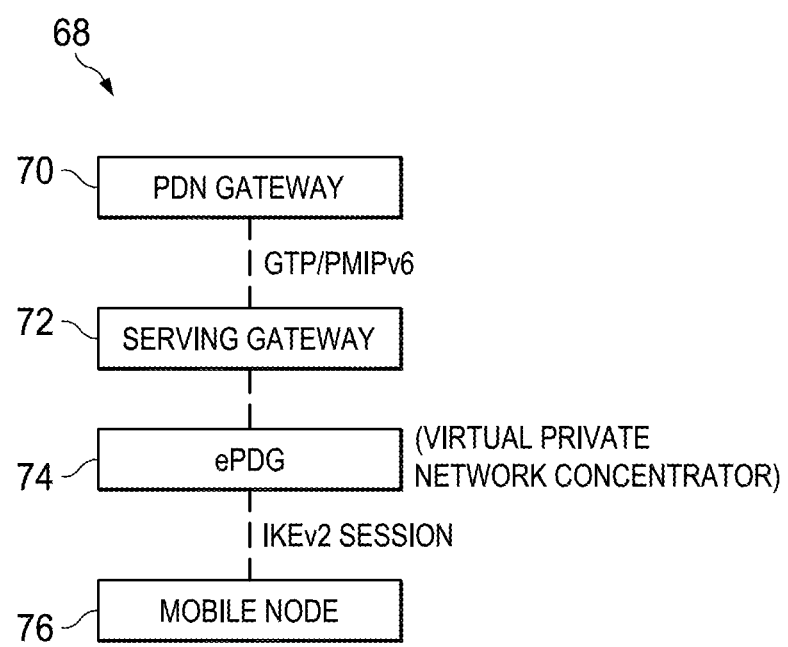
FIG. 4 is a simplified block diagram of another embodiment of a system for providing prefixes indicative of mobility properties in a network environment.

FIG. 4 is a simplified block diagram of a system 68 associated with an alternative embodiment associated with the present disclosure. FIG. 4 includes a packet data network (PDN) gateway 70, a serving gateway 72, an evolved Packet Data Gateway (ePDG) 74, and a mobile node 76. This particular configuration may be tied to the 3rd Generation Partnership Project (3GPP) Evolved Packet System architecture, but alternatively this depicted architecture may be applicable to other environments equally.

As a preliminary note, the 3GPP (e.g., Release 8) defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN (LTE) or they may be non-3GPP IP access networks such as DSL, Cable, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the ePDG, which provides for IPsec security associations to the user equipment over the untrusted IP access network. The ePDG (in turn) supports mobility, policy, and AAA interfaces to the EPC, similar to the trusted IP access networks. Currently, long-term evolution (LTE) networks represent the last step toward the 4th generation (4G) of radio technologies designed to increase the capacity and the speed of mobile networks.

When mobile node 76 roams from 3GPP access to an untrusted public wireless access, mobile node 76 sets up a VPN session to ePDG 74. The function of ePDG 74 can be collocated with serving gateway 72 in certain implementations. Serving gateway 72 can interact with PDN gateway 70 over GTP/PMIPv6 interfaces, where it obtains the prefixes that it needs for IP address/prefix assignments to mobile node 76. The prefixes can be assigned to mobile node 76 over an IKEv2 session. The assigned prefixes may be both from PDN gateway 70 and from ePDG 74. The prefix coloring provides a clear semantic on the prefix properties, local to ePDG 74 versus remote from PDN gateway 70.

Example embodiments of the present disclosure may also be applicable to scenarios involving DHCP prefix delegation (PD). Currently, DHCP specifications do not provide semantics for coloring delegated prefixes. Using the approach specified herein, and in employing DHCP vendor-specific attributes or standard attributes, the delegated prefixes can be colored. This can have a practical use in cable deployments, providing the ability for the provider and the CPE router to address space usage in deterministic ways. Furthermore, this offers the capability for efficient policy application on both ends of the session.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps discussed in the previous FIGURES illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and broadcast protocols, communication system 10 may be applicable to other exchanges, routing protocols, or routed protocols in which packets (not necessarily the routing protocol/packets described) are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Also, and in a separate endeavor, the communicative platform of communication system 10 could readily include (or have some of its infrastructure replaced with) a serving general packet radio service (GPRS) support node (SGSN), a gateway GPRS support node (GGSN), any type of network access server (NAS), etc. and all of these elements could interface with an authentication, authorization, and accounting (AAA) server. Moreover, the present disclosure is equally applicable to other cellular and/or wireless technology including Wi-Fi, WiMAX, Femto architectures, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A mobile router for a vehicle, comprising:
   at least one processor; and
   a memory element coupled to the at least one processor, wherein the processor and memory element are configured to cooperate such that the mobile router is configured to:
      receive a set of internet protocol (IP) subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
      receive an IP address request from an IP device running a vehicle application associated with the vehicle;
      when the vehicle application is a vehicle diagnostics application, assign the IP device an IP address from the first IP subnet prefix pool, such that the first prefix color is used for routing at least some of a plurality of packets of a communication session associated with the IP device; and
      when the vehicle application is not a vehicle diagnostics application, assign an IP address to the IP device from one of the IP subnet prefix pools different than the first IP subnet prefix pool having a prefix color different than the first prefix color that corresponds with the vehicle application, such that the prefix color is used for routing at least some of the plurality of packets of the communication session associated with the IP device.

2. The mobile router of claim 1, wherein a one-to-one mapping exists between each prefix color and a class of IP devices, and the mobile router is further configured to identify the IP device as belonging to a particular class of IP devices and assign an IP address from one of the IP subnet prefix pools having a prefix color that corresponds with the particular class of IP devices.

3. The mobile router of claim 1, wherein the vehicle application is selected from a group of vehicle applications consisting of:
   a) the vehicle diagnostics application;
   b) an Internet access application; and
   c) an in-vehicle application.

4. The mobile router of claim 1, wherein the prefix color of one of the IP subnet prefix pools indicates at least one routing restriction for certain packets routed beyond a home network associated with the mobile router.

5. The mobile router of claim 1, wherein the prefix color of one of the IP subnet prefix pools indicates mobility properties associated with communications involving the vehicle.

6. The mobile router of claim 1, wherein a plurality of interfaces are provided for particular communication flows associated with the vehicle, the plurality of interfaces selected from a group of interfaces consisting of:
   a) a WiFi interface;
   b) a satellite interface; and
   c) a cellular interface.

7. The mobile router of claim 1, wherein when the assigned IP address is associated with a prefix color that indicates a mobility property of the IP address, the mobile router is further configured to route packets associated with the prefix color through a home network when the IP device roams.

8. The mobile router of claim 1, further connected to a bus provided between a vehicle diagnostics application and the mobile router.

9. The mobile router of claim 1, wherein exchanges involving the prefix colors associated with the set of IP subnet prefix pools occur in a signaling plane.

10. The mobile router of claim 1, wherein the prefix color of one of the IP subnet prefix pools is maintained on an associated virtual local area network (VLAN).

11. The mobile router of claim 1, wherein the mobile router is coupled to an Intranet that is linked to a virtual private network (VPN) server, and mobile router receives the set of IP subnet prefix pools and associated prefix colors from the VPN server.

12. The mobile router of claim 11, wherein the VPN server maintains one or more traffic policies associated with communication flows involving the mobile router, wherein the VPN server is configured to access traffic policies to identify the services and capabilities associated with the vehicle.

13. The mobile router of claim 11, wherein the VPN server is coupled to a prefix pools element, and the VPN server is configured to access the prefix pools element based, at least in part, on incoming requests generated by the mobile router.

14. The mobile router of claim 13, wherein the prefix pools element is segregated based on particular usage scopes associated with the mobile router.

15. The mobile router of claim 1, wherein the mobile router is notified by a VPN concentrator of the one or more properties defined by each prefix color associated with the set of IP subnet prefix pools received by the mobile router.

16. One or more non-transitory tangible media that includes code for execution and when executed by a processor operable to perform operations comprising:
   receiving a set of internet protocol (IP) subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
   receiving an IP address request from an IP device running a vehicle application associated with the vehicle;
   when the vehicle application is a vehicle diagnostics application, assigning the IP device an IP address from the first IP subnet prefix pool, such that the first prefix color is used for routing at least some of a plurality of packets of a communication session associated with the IP device; and
   when the vehicle application is not a vehicle diagnostics application, assigning an IP address to the IP device from one of the IP subnet prefix pools different than the first IP subnet prefix pool having a prefix color different than the first prefix color that corresponds with the vehicle application, such that the prefix color is used for routing at least some of the plurality of packets of the communication session associated with the IP device.

17. The non-transitory tangible media of claim 16, wherein a one-to-one mapping exists between each prefix color and a class of IP devices, and the operations further comprise identifying the IP device as belonging to a particular class of IP devices and assigning an IP address from one of the IP subnet prefix pools having a prefix color that corresponds with the particular class of IP devices.

18. A method to be performed by a mobile router for a vehicle, the method comprising:
   receiving a set of internet protocol (IP) subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
   receiving an IP address request from an IP device running a vehicle application associated with the vehicle;
   when the vehicle application is a vehicle diagnostics application, assigning the IP device an IP address from the first IP subnet prefix pool, such that the first prefix color is used for routing at least some of a plurality of packets of a communication session associated with the IP device; and
   when the vehicle application is not a vehicle diagnostics application, assigning an IP address to the IP device from one of the IP subnet prefix pools different than the first IP subnet prefix pool having a prefix color different than the first prefix color that corresponds with the vehicle application, such that the prefix color is used for routing at least some of the plurality of packets of the communication session associated with the IP device.

19. The mobile router of claim 1, wherein each prefix color is a VLAN tag.

20. The non-transitory tangible media of claim 16, wherein the prefix color of one of the IP subnet prefix pools indicates mobility properties associated with communications involving the vehicle.

21. A mobile node running a vehicle application associated with a vehicle, the mobile node comprising:
   at least one processor; and
   a memory element coupled to the at least one processor, wherein the mobile node is configured to:
      request an Internet protocol (IP) address from a mobile router for the vehicle having a set of IP subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
      when the vehicle application is a vehicle diagnostics application, receive an IP address from the mobile router from the first IP subnet prefix pool, such that the first prefix color is used for routing at least some of a plurality of packets of a communication session associated with the mobile node; and
      when the vehicle application is not a vehicle diagnostics application, receive an IP address from the mobile router from one of the IP subnet prefix pools different than the first IP subnet prefix pool having a prefix color different than the first prefix color that corresponds with the vehicle application, such that the prefix color is used for routing at least some of the plurality of packets of the communication session associated with the mobile node.

22. The mobile node of claim 21, wherein the mobile node belongs to a particular class of IP devices, and the mobile node receives an IP address from one of the IP subnet prefix pools having a prefix color that corresponds with the particular class of IP devices.

23. The mobile node of claim 21, wherein the prefix color of one of the IP subnet prefix pools indicates at least one routing restriction for certain packets routed beyond a home network associated with the mobile node.

24. The mobile node of claim 21, wherein the prefix color of one of the IP subnet prefix pools indicates mobility properties associated with communications involving the vehicle.

25. The mobile node of claim 21, wherein the prefix color of one of the IP subnet prefix pools is maintained on an associated virtual local area network (VLAN).

26. One or more non-transitory tangible media that includes code for execution and when executed by a processor operable to perform operations comprising:
- running a vehicle application associated with a vehicle;
- requesting an Internet protocol (IP) address from a mobile router for the vehicle having a set of IP subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
- when the vehicle application is a vehicle diagnostics application, receiving an IP address from the mobile router from the first IP subnet prefix pool, such that the first prefix color is used for routing at least some of a plurality of packets of a communication session associated with the mobile node; and
- when the vehicle application is not a vehicle diagnostics application, receiving an IP address from the mobile router from one of the IP subnet prefix pools different than the first IP subnet prefix pool having a prefix color different than the first prefix color that corresponds with the vehicle application, such that the prefix color is used for routing at least some of the plurality of packets of the communication session associated with the mobile node.

27. The non-transitory tangible media of claim 26, wherein a one-to-one mapping exists between each prefix color and a class of IP devices, and the operations further comprise receiving an IP address from one of the IP subnet prefix pools having a prefix color that corresponds with a particular class of IP devices.

28. The non-transitory tangible media of claim 26, wherein the prefix color of one of the IP subnet prefix pools indicates at least one routing restriction for certain packets routed beyond a home network associated with the mobile node.

29. The non-transitory tangible media of claim 26, wherein the prefix color of one of the IP subnet prefix pools indicates mobility properties associated with communications involving the vehicle.

30. The non-transitory tangible media of claim 26, wherein the prefix color of one of the IP subnet prefix pools is maintained on an associated virtual local area network.

31. A method to be performed by a mobile node running a vehicle application associated with a vehicle, the method comprising:
- requesting an Internet protocol (IP) address from a mobile router for the vehicle having a set of IP subnet prefix pools based on services and capabilities associated with the vehicle, wherein each IP subnet prefix pool is accompanied by an associated prefix color that defines one or more properties of IP addresses in the IP subnet prefix pool, and further wherein a first IP subnet prefix pool has an associated first prefix color indicating that IP addresses in the first IP subnet prefix pool are associated with vehicle diagnostics;
- when the vehicle application is a vehicle diagnostics application, receiving an IP address from the mobile router from the first IP subnet prefix pool, such that the first prefix color is used for routing at least some of a plurality of packets of a communication session associated with the mobile node; and
- when the vehicle application is not a vehicle diagnostics application, receiving an IP address from the mobile router from one of the IP subnet prefix pools different than the first IP subnet prefix pool having a prefix color different than the first prefix color that corresponds with the vehicle application, such that the prefix color is used for routing at least some of the plurality of packets of the communication session associated with the mobile node.

32. The method of claim 31, wherein a one-to-one mapping exists between each prefix color and a class of IP devices, the method further including receiving an IP address from one of the IP subnet prefix pools having a prefix color that corresponds with a particular class of IP devices.

33. The method of claim 31, wherein the prefix color of one of the IP subnet prefix pools indicates at least one routing restriction for certain packets routed beyond a home network associated with the mobile node.

34. The method of claim 31, wherein the prefix color of one of the IP subnet prefix pools indicates mobility properties associated with communications involving the vehicle.

35. The method of claim 31, wherein the prefix color of one of the IP subnet prefix pools is maintained on an associated virtual local area network.

* * * * *